United States Patent
Janjua et al.

(10) Patent No.: US 11,613,472 B2
(45) Date of Patent: Mar. 28, 2023

(54) DUMBBELL-SHAPED CALCIUM HYDROXIDE NANOPARTICLES, AN ENHANCED FUEL COMPRISING THE NANOPARTICLES, AND A METHOD FOR MAKING

(71) Applicant: KING FAHD UNIVERSITY OF PETROLEUM AND MINERALS, Dhahran (SA)

(72) Inventors: Mohammad Ramzan Saeed Ashraf Janjua, Dhahran (SA); Saba Jamil, Dhahran (SA); Shanza Rauf Khan, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 685 days.

(21) Appl. No.: 16/655,754

(22) Filed: Oct. 17, 2019

(65) Prior Publication Data
US 2021/0024363 A1  Jan. 28, 2021

Related U.S. Application Data

(60) Provisional application No. 62/877,032, filed on Jul. 22, 2019.

(51) Int. Cl.
  *C01F 11/02* (2006.01)
  *C10L 1/12* (2006.01)
(52) U.S. Cl.
  CPC .............. *C01F 11/02* (2013.01); *C10L 1/1216* (2013.01); *C01P 2004/12* (2013.01);
(Continued)

(58) Field of Classification Search
CPC .. C01F 11/022; C10L 1/1216; C01P 2004/12; C01P 2004/50; C01P 2004/64; C01P 2006/16; C01P 2006/32
(Continued)

(56) References Cited

U.S. PATENT DOCUMENTS

2006/0137567 A1   6/2006  Yadav
2008/0168863 A1*  7/2008  Sun ........................ B22F 1/148
                                                       75/343
(Continued)

FOREIGN PATENT DOCUMENTS

CN  108455643 A  *  8/2018  ............ C01F 11/181
CN  108455643 A     8/2018
(Continued)

OTHER PUBLICATIONS

Caterino et al., "Calcium Rich Food Wastes Based Catalysts for Biodiesel Production", Waste and Biomass Valorization, vol. 8, Issue 5, Jul. 2017 (2 pages).
(Continued)

*Primary Examiner* — Melissa S Swain
(74) *Attorney, Agent, or Firm* — Oblon, McClelland, Maier & Neustadt, L.L.P.

(57) ABSTRACT

Nanoparticles of calcium hydroxide having a dumbbell shape, wherein the dumbbell shape has rounded ends separated by a narrow central portion, wherein a ratio of a largest width of the central portion to a largest width of the rounded ends is 0.30 to 0.75, a length is in the range of 500 nm to 1100 nm, the largest width of the narrow central portion is 100 to 250 nm, and the largest width of the narrow central portion is 100 to 250 nm. The nanoparticles have a mesoporous structure and are made up of subparticles that have a size of 5 to 75 nm. A method of making the nanoparticles
(Continued)

from calcined calcium carbonate sources is disclosed. Also disclosed is an enhanced fuel containing the nanoparticles.

8 Claims, 7 Drawing Sheets

(52) U.S. Cl.
CPC ...... *C01P 2004/50* (2013.01); *C01P 2004/64* (2013.01); *C01P 2006/16* (2013.01); *C01P 2006/32* (2013.01)

(58) Field of Classification Search
USPC .......................................................... 423/636
See application file for complete search history.

(56) References Cited

U.S. PATENT DOCUMENTS

2012/0168669 A1* 7/2012 Che ..................... H01F 1/0054
264/9
2022/0370357 A1* 11/2022 Stanton ................ C07D 207/06

FOREIGN PATENT DOCUMENTS

CN 109261117 A 1/2019
IN 232313 B 7/2007

OTHER PUBLICATIONS

G. Taglieri et al., "Synthesizing Alkaline Earth Metal Hydroxides Nanoparticles through an Innovative, Single-Step and Eco-Friendly Method", Solid State Phenomena, vol. 286, Jan. 2019 (2 pages).

Jirimali et al., "Waste Eggshell-Derived Calcium Oxide and Nanohydroxyapatite Biomaterials for the Preparation of LLDPE Polymer Nanocomposite and Their Thermomechanical Study", Polymer-Plastics Technology and Engineering Journal, vol. 57, Issue 8, 2018 (2 pages).

R. Rosmamuhamadani et al., "Wear characterization of nano-hydroxyapatite with addition of titanium (HA-Ti)", IOP Conference Series: Materials Science and Engineering 348, 2018 (8 pages).

* cited by examiner

DUMBBELL-SHAPED CALCIUM HYDROXIDE NANOPARTICLES, AN ENHANCED FUEL COMPRISING THE NANOPARTICLES, AND A METHOD FOR MAKING

BACKGROUND OF THE INVENTION

Field of the Invention

The present invention relates to nanoparticles of calcium hydroxide having a dumbbell shape, an enhanced fuel comprising the nanoparticles, and a method for making the nanoparticles.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Eggs are consumed due to their high protein and carbohydrate content. Therefore, egg shell waste is produced daily in large quantities from food processing and manufacturing industries [M. A. Mijan, D. H. Kim, H. S. Kwak, Int. J. Food Sci. Technol. 49 (7) (2014) 1751-1757; and A. Tavangar, B. Tan, K. Venkatakrishnan, J. Nanobiotechnol. 9 (1) (2011) 1]. Currently, this egg shell waste is discarded. Due to rising pollution effects and environmental concerns, there is now a great focus on reusability or transformation of waste into value-added products. Egg shells are primarily composed of calcium carbonate [I. Abdulrahman, H. J. Tijani, B. A. Mohammed, H. Saidu, H. Yusuf, M. Ndejiko Jibrin, S. Mohammed, J. Mater. (2014) (2014) 1-6]. Calcium carbonate decomposes to calcium oxide at high temperatures, around 900° C. temperatures in some literature examples. [M. Amin Alavi, A. Morsali, J. Exp. Nanosci. 5 (2) (2010) 93-105]. However, Engin et al. have indicated that calcium carbonate is completely decomposed into calcium oxide at 1100° C. temperature [B. Engin, H. Demirtas, M. Eken, Radiat. Phys. Chem. 75 (2) (2006) 268-277]. Calcium oxide may be converted to calcium hydroxide upon exposure to water. As such, egg shell waste is an attractive source of calcium carbonate that may be used in applications requiring calcium carbonate, calcium oxide, or calcium hydroxide.

Nowadays, attention has been directed towards the development of low cost, simple, and environmentally-friendly methods for synthesis of micro/nano structures. Irradiation methods are considered a simple method with no need of media preparation. In this method the sample is treated with ultrasound [T. A. Hassan, V. K. Rangari, R. K. Rana, S. Jeelani, Ultrason. Sonochem. 20 (5) (2013) 1308-1315], infrared, microwave [P. Khemthong, C. Luadthong, W. Nualpaeng, P. Changsuwan, P. Tongprem, N. Viriya-empikul, K. Faungnawakij, Catal. Today 190 (1) (2012) 112-116], laser [A. Tavangar, B. Tan, K. Venkatakrishnan, J. Nanobiotechnol. 9 (1) (2011) 1] or any other type of radiation to fabricate micro/nano structures. For example, Mosaddegh et al. have treated egg shells under ultrasound radiation and synthesized nanocrystals of calcium carbonate [E. Mosaddegh, Ultrason. Sonochem. 20 (6) (2013) 1436-1441]. Khemthong et al. have synthesized calcium oxide nanoparticles by irradiating egg shells under microwave radiations [P. Khemthong, C. Luadthong, W. Nualpaeng, P. Changsuwan, P. Tongprem, N. Viriya-empikul, K. Faungnawakij, Catal. Today 190 (1) (2012) 112-116]. Tavanger et al. have used a femtosecond laser source for the synthesis of calcium carbonate materials with a nanofibrous morphology from egg shell waste [A. Tavangar, B. Tan, K. Venkatakrishnan, J. Nanobiotechnol. 9 (1) (2011) 1]. Engin et al. have observed that irregularly-shaped structures are formed on heat treatment of egg shells [B. Engin, H. Demirtas, M. Eken, Radial. Phys. Chem. 75 (2) (2006) 268-277]. These examples demonstrate that the type of radiation used is an important factor for controlling the morphology of the product. Further, the morphology and size distribution of the product cannot be controlled by using heat treatment only.

In view of the foregoing, one objective of this disclosure is the synthesis of calcium hydroxide ($Ca(OH)_2$) nanoparticles by infrared radiation treatment. Calcium oxide and $Ca(OH)_2$ are extensively used in field of bioceramic [Q. Zhang, E. Schmelzer, J. C. Gerlach, I. Nettleship, Mater. Sci. Eng. C 73 (2017) 684-691], catalysis [S. Niju, K. M. S. Begum, N. Anantharaman, Arab. J. Chem. 9 (5) (2016) 633-639], [Z. Wang, F. Wang, J. Cao, J. Wang, Fuel Proc. Technol. 91 (8) (2010) 942-950], [M. Kaur, A. Ali, Renew. Ener. 36 (11) (2011) 2866-2871], [J. Safaei-Ghomi, M. A. Ghasemzadeh, M. Mehrabi, Sci. Iran. 20 (3) (2013) 549-554], [S. Jamil, M. R. S. A. Janjua, S. R. Khan, Aust. J. Chem. 70 (8) (2018) 908-916], and [S. Jamil, M. R. S. A. Janjua, S. R. Khan, N. Jahan, Mater. Res. Exp. 4 (1) (2017) 015902-015910], biofuels synthesis [N. Viriya-empikul, P. Krasae, B. Puttasawat, B. Yoosuk, N. Chollacoop, K. Faungnawakij, Biores. Technol. 101 (10) (2010) 3765-3767] and [M. Zabeti, W. M. A. W. Daud, M. K. Aroua, Fuel Proc. Technol. 90 (6) (2009) 770-777], composites [F. Andriulo, R. Giorgi, C. C. Steindal, H. Kutzke, S. Braovac, P. Baglioni, Pure. Appl. Chem. 89 (1) (2017) 29-39], antiseptics [P. Louwakul, A. Saelo, S. Khemaleelakul, Clin. Oral Investig. 21 (3) (2017) 865-871] and [R. Giorgi, D. Chelazzi, P. Baglioni, Langmuir 21 (23) (2005) 10743-10748], medicine [S. Swarup, A. Rao, K. Boaz, N. Srikant, R. Shenoy, J. Clin. Pediat. Dent. 38 (3) (2014) 201-206], adsorption [T. N. Ramesh, D. V. Kirana, A. Ashwini, T. Manasa, J. Saudi Chem. Soc. 21 (2) (2017) 165-171], [S. Wu, Y. Zhu, Indust. Eng. Chem. Res. 49 (6) (2010) 2701-2706], and [N. Oladoja, I. Ololade, S. Olaseni, V. Olatujoye, O. Jegede, A. Agunloye, Indust. Eng. Chem. Res. 51 (2) (2011) 639-648] and coating [C. Rodriguez-Navarro, A. Suzuki, E. Ruiz-Agudo, Langmuir 29 (36) (2013) 11457-11470].

Nowadays, many nanosized materials are added into traditional fuels to improve their physicochemical characteristics. Reported studies have shown that addition of nano scale boron [B. Van Devener, J. P. L. Perez, J. Jankovich, S. L. Anderson, Energy Fuel 23 (12) (2009) 6111], aluminum [Y. Gan, L. Qiao, Combus. Flame 158 (2) (2011) 354-368], alumina [W. Williams, J. Buongiomo, L. W. Hu, J. Heat Trans. 130 (4) (2008) 042412], [T. Shaafi, R. Velraj, Renew. Energy 80 (2015) 655-663], and [J. S. Basha, R. Anand, J. Braz. Soc. Meehan. Sci. Eng. 35 (3) (2013) 257-264] and ceria [V. Sajith, C. Sobhan, G. Peterson, Adv. Meehan. Eng. 21 (I) (2010) 143-151], [B. Gantt, S. Hogue, R. D. Willis, K. M. Fahey, J. M. Delgado-Saborit, R. M. Harrison, G. B. Erdakos, P. V. Bhave, K. M. Zhang, K. Kovalcik, Environ. Sci. Technol. 48 (18) (2014) 10607-10613], and [V. A. M. Selvan, R. Anand, M. Udayakumar, Fuel 130 (2014) 160-167] into fuel can influence its energy release, viscosity, density and ignition delay. These examples have demonstrated that each additive has affected only a specific property or properties of the fuel. Previous studies have shown that aluminum and alumina have largely reduced the ignition delay and enhanced the burning rate of fuel. Allen et al. have reported that the ignition delay of ethanol was reduced by 32% on addition of 2 wt % aluminum nanoparticles into it [C. Allen, G. Mittal, C.-J. Sung, E. Toulson, T. Lee, Proc. Combust. Inst. 33 (2) (2011) 3367-3374]. Guru et al. have reported that manganese has a greater effect on the reduction of the freezing point of the fuel when compared to that of copper or magnesium [M. Guru, U. Karakaya, D. Altiparmak, A. Alicilar, Energy Conv. Manag. 43 (8) (2002) 1021-1025]. Therefore, attention has shifted towards the development of a fuel additive which affects all the properties of fuels in such a way that an advantageous balance can be achieved among them.

In view of the foregoing, one objective of the present disclosure is to provide nanoparticles of calcium hydroxide having a dumbbell shape. Another objective is to provide a method for producing the nanoparticles using infrared radiation. These nanoparticles are one component of an enhanced fuel provided. The enhanced fuel has properties that may be advantageous over other fuels.

SUMMARY OF THE INVENTION

The present disclosure relates to nanoparticles of calcium hydroxide having a dumbbell shape, wherein the dumbbell shape has rounded ends separated by a narrow central portion, wherein a ratio of a largest width of the central portion to a largest width of the rounded ends is 0.30 to 0.75, and a length in the range of 500 nm to 1100 nm.

In some embodiments, the nanoparticles have a largest width of the narrow central portion of 100 to 250 nm, a largest width of the rounded ends is 250 to 500 nm.

In preferred embodiments, the nanoparticles have a mesoporous or macroporous structure.

In preferred embodiments, the nanoparticle are made up of subparticles which have a size of 5 to 75 nm.

In preferred embodiments, the nanoparticles have a thermal conductivity of 0.40 to 0.80 $Wm^{-1}K^{-1}$ in a temperature range 290 to 550 K, a thermal diffusivity of 0.35 to 0.90 $mm^2s^{-1}$ in a temperature range 290 to 550 K, and a specific heat of 2.75 to 7.00 $MJm^{-2}K^{-1}$ in a temperature range 290 to 550 K.

The disclosure also relates to an enhanced fuel made of a hydrocarbon and the nanoparticles at a concentration of 2 mg/L to 80 mg/L, based on a total volume of the enhanced fuel.

In preferred embodiments, the enhanced fuel has a calorific value of 1.50 to 45.80 MJ/kg, a flash point of 65 to 75° C., a fire point of 74 to 85° C., a specific gravity of 0.1175 to 0.3500 g/cm3 at 25° C., a kinematic viscosity of 2.70× 10-6 to 3.30×10-6 m2/s at 25° C., and a pour point of −15 to −18° C.

In preferred embodiments, the hydrocarbon is a petroleum diesel, a biodiesel, or a synthetic diesel.

In preferred embodiments, the enhanced fuel has a cetane number of 40 to 60.

The disclosure also relates to a method of making the nanoparticles involving calcining powdered egg shells at a temperature of 700 to 1100° C. to form a calcined powder, mixing the calcined powder with water to form a paste, heating the paste at a temperature of 200 to 300° C. to form a calcium hydroxide solid, and grinding the calcium hydroxide solid to fine powder.

In preferred embodiments, the powdered egg shells are obtained by removing the organic membrane from egg shells, washing and boiling the egg shells in water, and grinding the egg shells to form powdered egg shells.

BRIEF DESCRIPTION OF THE DRAWINGS

The foregoing paragraphs have been provided by way of general introduction, and are not intended to limit the scope of the following claims. A more complete appreciation of the invention and many of the attendant advantages thereof will be readily obtained as the same becomes better understood by reference to the following detailed description when considered in connection with the accompanying drawings, wherein:

DETAILED DESCRIPTION OF THE INVENTION

Figure 1:
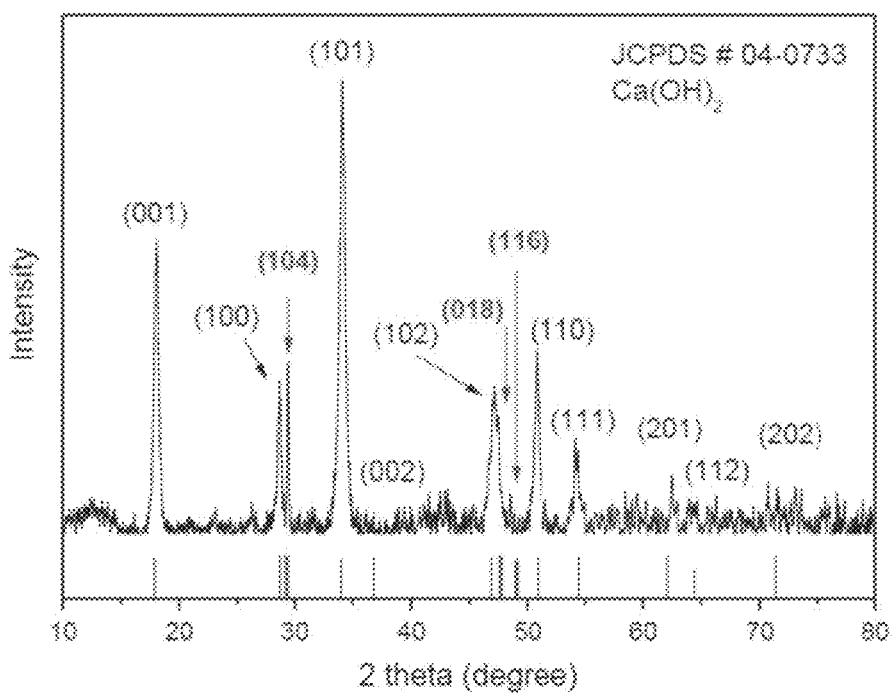
FIG. 1 shows the XRD pattern of product obtained after infrared radiation treatment (black color arrows refer to $Ca(OH)_2$ and red color arrows refer to $CaCO_3$)

In the following description, it is understood that other embodiments may be utilized and structural and operational changes may be made without departure from the scope of the present embodiments disclosed herein.

Definitions

The phrase "substantially free", unless otherwise specified, describes a particular component being present in an amount of less than about 1 wt. %, preferably less than about 0.5 wt %, more preferably less than about 0.1 wt. %, even more preferably less than about 0.05 wt. %, yet even more preferably 0 wt. %, relative to a total weight of the composition being discussed.

As used herein, the term "substantially parallel" means that the indicated elements are aligned such that the angle created by the indicated elements does not exceed 22.5°.

As used herein, the terms "optional" or "optionally" means that the subsequently described event(s) can or cannot occur or the subsequently described component(s) may or may not be present (e.g., 0 wt. %).

As used herein, "inhibit" means prevent, retard, slow, hinder, reverse, remove, lessen, reduce an amount of, or delay an undesirable process or an undesirable composition, or combinations thereof.

As used herein, the phrase "thermal conductivity" means the rate at which heat passes through a material, expressed as the amount of heat that passes per unit time measured in watts through a unit area such as $m^2$ or $cm^2$ per degree of temperature difference between two areas of the material at different temperatures.

As used herein, the phrase "thermal diffusivity" means the thermal conductivity of a material divided by the density of that material and specific heat of that material.

As used herein, the phrase "calorific value" means the amount of heat energy released by a material during complete combustion of that material per unit mass, such as kg.

As used herein, the phrase "flash point" means the minimum temperature at which the vapor phase of a material will ignite when exposed to an ignition source.

As used herein, the phrase "fire point" means the minimum temperature at which the vapor phase of a material will continue burning after the material has been exposed to an ignition source and that ignition source has subsequently been removed.

As used herein, the phrase "specific gravity" means the ratio of the density of a substance to the density of a known standard. Unless mentioned otherwise, the specific gravity measurements recited herein are in reference to a silicone oil standard having a density of 0.9336+/−0.0002 g/mL.

As used herein, the phrase "kinematic viscosity" means the dynamic viscosity of a material, meaning the resistance of a material to deformation of that material at a given rate, divided by the density of the material expressed in units of $m^2/s$.

As used herein, the phrase "pour point" means the temperature at which a material will not flow when a container of the material which had previously been held vertically long enough for the material to collect in the bottom of the container and appear undisturbed is transitioned to a horizontal position such that the material may flow to redistribute in the container and the material does not flow within five seconds, plus a factor of 3° C.

The present disclosure relates a novel method for fabrication $Ca(OH)_2$ nanoparticles from egg shell waste. An overview of nano/micro scale morphologies of $Ca(OH)_2$ and their method of synthesis are given in Table 1. Infra-red radiation was used for the synthesis of calcium hydroxide nanoparticles. The infrared method disclosed herein produces nanoparticles having a dumbbell morphology. Previously, solvothermal and co-precipitation methods have been used for the morphologically-controlled synthesis of nanostructures of $Ca(OH)_2$ from egg shell waste (Table 1). But the avoidance of hazardous chemicals possible with the method disclosed herein may be advantageous over previous methods (Table 1). The calcium-based compounds are used as a fuel additive previously.

Nanoparticles of Calcium Hydroxide

The present disclosure provides nanoparticles of calcium hydroxide. In some embodiments, the calcium hydroxide is present as a crystalline substance with a structure comprising a trigonal unit cell, a space group P3m1, and exhibiting an X-ray diffraction pattern that may be indexed to a known substance comprising calcium hydroxide. The nanoparticles have a dumbbell shape or morphology and not a flower like morphology [Asikin-Mijan, et. al. Chem. Eng. J. 262 (2015) 1043-1051—incorporated herein by reference], a cube like morphology [Giorgi, et. al. Langmuir 21 (23) (2005) 10743-10748; Asikin-Mijan, et. al. Chem. Eng. J. 262 (2015) 1043-1051—incorporated herein by reference], a hexagon like morphology [Daniele, et. al. J. Cult. Herit. 13 (1) (2012) 40-46; Ambrosi, et. al. Langmuir 17 (14) (2001) 4251-4255—incorporated herein by reference], a sphere like morphology [Liu, et. al. Mater. Lett. 64 (23) (2010) 2575-2577; Amin Alavi, et al. J. Exp. Nanosci. 5 (2) (2010) 93-105— incorporated herein by reference], a hexagonal prism like morphology [Poggi, et. al. J. Colloid Interf. Sci 473 (2016) 1-8—incorporated herein by reference] or an irregular morphology [Asikin-Mijan, et. al. Chem. Eng. J. 262 (2015) 1043-1051; Amin Alavi, et al. J. Exp. Nanosci. 5 (2) (2010) 93-105—incorporated herein by reference].

The dumbbell shape or morphology is one that generally has rounded ends separated by a narrow central portion with a width less than that of the rounded ends. The rounded ends may have a shape similar to that of a sphere, ellipsoid, ovoid, a globular shape, or a shape similar to another object which may be described as rounded. The narrow central portion may have straight sides or curving sides. A portion of the nanoparticles where the rounded ends meet the narrow central portion may have a tapered shape or other gradual change in width from that of the rounded ends to that of the narrow central portion. In some embodiments, when the rounded end(s) have an ellipsoid or ovoid shape, the longest axis of the rounded end(s) is preferably aligned parallel or substantially parallel with the longitudinal axis of the narrow central portion. In some embodiments, the ratio of the largest width of the narrow central portion to the largest width of the rounded ends is 0.30 to 0.75. In some embodiments, the overall length of the nanoparticles [101 in FIG. 5] is 500 nm to 1100 nm, preferably 600 nm to 1000 nm, preferably 700 nm to 950 nm, preferably 800 to 900 nm.

TABLE 1

Comparison of the various morphologies of $Ca(OH)_2$ synthesized by different methods from many calcium sources.

| Source | Chemical composition | Morphology | Solvent | Synthesis method | Size | Refs. |
|---|---|---|---|---|---|---|
| Egg shell | $Ca(OH)_2$ | Dumb bell like | Water | Infrared radiation treatment | 0.8-0.9 μm | This week |
| Clam shell | $Ca(OH)_2$ | Flower like | Ethylene glycol-water | Surfactant-hydration method | 25-42 nm | [47] |

TABLE 1-continued

Comparison of the various morphologies of Ca(OH)₂ synthesized by different methods from many calcium sources.

| Source | Chemical composition | Morphology | Solvent | Synthesis method | Size | Refs. |
|---|---|---|---|---|---|---|
| Clam shell | Ca(OH)₂ | Cube like | Diethyl ether-water | Surfactant-hydration method | 46-57 nm | [47] |
| Clam shell | Ca(OH)₂ | Irregular | N-Cetyl-N,N,N-trimethyl ammonium bromide-water | Surfactant-hydration method | 120-140 nm | [47] |
| Clam shell | Ca(OH)₂ | Irregular | Water | Hydration method | 110-150 nm | [47] |
| Commercial calcium chloride | Ca(OH)₂ | Cube like | 2-Propanol | Co-precipitation | 0.5-1.5 μm | [20] |
| Commercial calcium chloride | Ca(OH)₂ | Hexagon like | Water | Co-precipitation | 90-130 nm | [48] |
| Commercial calcium chloride | Ca(OH)₂ | Hexagon like | Water | Co-precipitation method | 180-220 nm | [49] |
| Commercial calcium acetate | Ca(OH)₂ | Irregular | Water | Ultrasonic assisted method | 20-100 nm | [4] |
| Commercial calcium acetate | Ca(OH)₂ | Sphere like | Water | Ultrasonic assisted method | 80-100 nm | [4] |
| Commercial granular calcium | Ca(OH)₂ | Hexagonal prism like | Ethanol-water | Solvo-thermal method | 260-290 nm | [50] |
| Commercial granular calcium | Ca(OH)₂ | Hexagonal prism like | n-propanol-water | Solvo-thermal method | 330-360 nm | [50] |
| Commercial calcium ingot | Ca(OH)₂ | Sphere like | — | Hydrogen plasma-metal reaction method | 90-110 nm | [51] |

[4] [M. Amin Alavi, A. Morsali, J. Exp. Nanosci. 5 (2) (2010) 93-105]
[20] [R. Giorgi, D. Chelazzi, P. Baglioni, Langmuir 21 (23) (2005) 10743-10748]
[47] [N. Asikin-Mijan, Y. Taufiq-Yap, H. Lee, Chem. Eng. J. 262 (2015) 1043-1051]
[48] [V. Daniele, G. Taglieri, J. Cult. Herit. 13 (I) (2012) 40-46]
[49] [M. Ambrosi, L. Dei, R. Giorgi, C. Neto, P. Baglioni, Langmuir 17 (14) (2001) 4251-4255.]
[50] [G. Poggi, N. Toccafondi, D. Chelazzi, P. Canton, R. Giorgi, P. Baglioni, J. Colloid Interf. Sci. 473 (2016) 1-8]
[51] [T. Liu, Y. Zhu, X. Zhang, T. Zhang, T. Zhang, X. Li, Mater. Lett. 64 (23) (2010) 2575-2577]

In some embodiments, the largest width of the narrow central portion [102] is 100 nm to 250 nm, preferably 125 nm to 225 nm, preferably 150 nm to 200 nm. In some embodiments, the length of the narrow central portion is 25 to 600 nm, preferably 75 to 400 nm, preferably 100 to 300 nm. In some embodiments, the largest width of the rounded ends [103-] is 250 inn to 500 nm, preferably 275 nm to 450 nm, preferably 300 nm to 400 nm. The rounded ends may be of the same size or of different sizes that still satisfy the above criteria. In some embodiments, the ratio of the largest widths of the two rounded ends is 0.30 to 1.00, preferably 0.5 to 1.00, preferably 0.75 to 1.00, preferably 0.9 to 1.00

In preferred embodiments, the nanoparticles have a porous structure. In some embodiments, the porous structure generally comprises mesopores having a pore diameter of 2 to 50 nm, preferably 5 to 45 nm, preferably 10 to 40 nm, or macropores having a pore diameter of 50 to 250 nm, preferably 55 to 225 nm, preferably 60 to 200 nm, preferably 75 to 175 nm. In some embodiments, the nanoparticles have a surface texture that is rough, porous, scalloped, dimpled, bumpy, or other term denoting non-smooth or completely compacted. In some embodiments, the nanoparticles are composed of many individual subparticles of calcium hydroxide that are arranged into the larger structure (dumbbell shape) of the nanoparticle. In some embodiments, the subparticles have a spherical or ovoid shape. In some embodiments, the spaces in between the subparticles provide the mesopores or macropores of the nanoparticles. In some embodiments, the subparticles have a size of 5 nm to 75 nm, preferably 7.5 nm to 62.5 nm, preferably 10 nm to 50 nm.

The dumbbell shaped nanoparticles of calcium hydroxide disclosed here are preferably substantially free of other calcium-containing materials/minerals such as calcium oxide and calcium carbonate (see CN108455643A). In some embodiments, no more than 10 wt %, preferably no more than 5 wt %, preferably no calcium carbonate is present in the nanoparticles based on the total weight of the nanoparticles. Minor amounts of calcium carbonate in the calcium hydroxide nanoparticles may in some cases arise during the production of the nanoparticles where incomplete transformation from calcium carbonate takes place or reaction of atmospheric carbon dioxide with the calcium hydroxide takes place after preparation. In some embodiments, the calcium carbonate that is present in the nanoparticles is crystalline and may be detected in an X-ray diffraction pattern. In preferred embodiments, the nanoparticles contain at least 90 wt % calcium hydroxide, preferably at least 92.5 wt % calcium hydroxide, preferably at least 95 wt % calcium hydroxide, preferably at least 97.5 wt % calcium hydroxide, preferably 100 wt % calcium hydroxide, based on the total weight of the nanoparticles.

The nanoparticles disclosed herein have been found to possess advantageous thermal properties, which can be determined using any procedure known by those of ordinary skill in the art. In some embodiments of the invention, the nanoparticles have a thermal conductivity of 0.40 to 0.80 $Wm^{-1}K^{-1}$, preferably 0.45 to 0.75 $Wm^{-1}K^{-1}$ in the temperature range 209 to 550 K. In some embodiments, the thermal conductivity increases with increasing temperature in the range 290 to 550 K, with values of thermal conductivity of 0.40 to 0.80 $Wm^{-1}K^{-1}$, preferably 0.42 to 0.60 $Wm^{-1}K^{-1}$, preferably 0.45 to 0.55 $Wm^{-1}K^{-1}$ in the temperature range 290 to 310 K, preferably 295 to 305 K and values of thermal conductivity of 0.40 to 0.80 $Wm^{-1}K^{-1}$, preferably 0.60 to 0.75 $Wm^{-1}K^{-1}$, preferably 0.65 to 0.70 $Wm^{-1}K^{-1}$ in the temperature range 525 to 550 K, preferably 530 to 540 K.

Some materials show a change in the density of the material with a change in the temperature of the material. Since the density of a material may change some of the thermal properties of the material, a measurement or thermal property that is independent of the density or accounts for changes in the density may be used to characterize the thermal properties of a material. One such measurement is the thermal diffusivity, which is the thermal conductivity of a material divided by the density of that material. In some embodiments, the nanoparticles have a thermal diffusivity of 0.35 to 0.90 $mm^2s^{-1}$, preferably 0.42 to 0.82 $mm^2s^{-1}$ in the temperature range 290 to 550 K. In some embodiments, the nanoparticles have a thermal diffusivity of 0.40 to 0.55 $mm^2s^{-1}$ in the temperature range 325 to 550 K.

As heat is applied to a material, the temperature of that material rises. The amount of heat required to change the temperature of a material by a unit temperature such as 1 K is known as the specific heat of that material. In some embodiments, the nanoparticles have a specific heat of 5.00 to 7.00 $MJm^{-2}K^{-1}$, preferably 5.10 to 6.90 $MJm^{-2}K^{-1}$, preferably 5.25 to 6.75 $MJm^{-2}K^{-1}$, preferably 5.30 to 6.60 $MJm^{-2}K^{-1}$ in a temperature range of 325 to 550K. In some embodiments, the nanoparticles have a specific heat of 2.00 to 4.00 $MJm^{-2}K^{-1}$, preferably 2.50 to 3.50 $MJm^{-2}K^{-1}$, preferably 2.75 to 3.25 $MJm^{-2}K^{-1}$, preferably 2.90 to 3.20 $MJm^{-2}K^{-1}$ in a temperature range of 290 to 310 K.

Enhanced Fuel Containing Nanoparticles

The nanoparticles described above may find use as an additive to a fuel to form an enhanced fuel. This enhanced fuel comprises a hydrocarbon, or in some embodiments a hydrocarbon mixture, and the nanoparticles described above. In some embodiments, the nanoparticles are included in the enhanced fuel at a concentration of 2 to 80 mg/L, preferably 5 to 60 mg/L, preferably 10 to 40 mg/L, based on a total volume of the enhanced fuel.

A fuel may be characterized by many of the physical properties related to its handling or combustion characteristics. In some embodiments, the enhanced fuel described above has a calorific value of 1.50 to 45.80 MJ/kg, preferably 20 to 45 MJ/kg, preferably 30 to 42 MJ/kg. In some embodiments, the enhanced fuel has a flash point of 65 to 75° C. In preferred embodiments, the enhanced fuel has an increase in flash point of 0.1 to 10° C., preferably 0.5 to 9° C., preferably 1 to 8° C., preferably 1.5 to 7.5° C. when the nanoparticles are present in the fuel at 10 to 40 mg/L compared to the fuel without nanoparticles. In some embodiments, the enhanced fuel has a fire point of 74 to 85° C. In preferred embodiments, the enhanced fuel has an increase in fire point of 0.1 to 12° C., preferably 0.5 to 11° C., preferably 1 to 10° C., preferably 1.5 to 9.5° C. when the nanoparticles are present in the fuel at 10 to 40 mg/L compared to the fuel without nanoparticles. In some embodiments, the enhanced fuel has a specific gravity of 0.1175 to 0.3500 $g/cm^3$ at 25° C., preferably 0.1475 to 0.3475 $g/cm^3$ at 25° C. In preferred embodiments, the enhanced fuel has an increase in specific gravity of 0.0050 to 0.5000 $g/cm^3$, preferably 0.0100 to 0.3000 $g/cm^3$, preferably 0.0250 to 0.2750 $g/cm^3$, preferably 0.0333 to 0.2323 $g/cm^3$ at 25° C. when the nanoparticles are present in the fuel at 10 to 40 mg/L compared to the fuel without nanoparticles. In some embodiments, the enhanced fuel has a kinematic viscosity of $2.70 \times 10^6$ to $3.30 \times 10^{-6}$ $m^2/s$ at 25° C., preferably $2.75 \times 10^{-6}$ to $3.25 \times 10^{-6}$ $m^2/s$ at 25° C., preferably $2.76 \times 10^{-6}$ to $3.20 \times 10^{-6}$ $m^2/s$ at 25° C. In preferred embodiments, the enhanced fuel has an increase in kinematic viscosity of $0.0001 \times 10^{-6}$ to $5 \times 10^{-6}$ $m^2/s$, preferably $0.001 \times 10^{-6}$ to $1 \times 10^{-6}$ $m^2/s$, preferably $0.0025 \times 10^{-6}$ to $0.75 \times 10^{-6}$ $m^2/s$, preferably $0.004 \times 10^{-6}$ to $0.52 \times 10^6$ $m^2/s$ at 25° C. when the nanoparticles are present in the fuel at 10 to 40 mg/L compared to the fuel without nanoparticles. In some embodiments, the enhanced fuel has a pour point of −15 to −18° C., preferably −15.5 to −17° C. In preferred embodiments, the enhanced fuel has an decrease in cloud point of 0.1 to 5° C., preferably 0.5 to 4° C., preferably 0.75 to 3° C., preferably 1.0 to 2.5° C. when the nanoparticles are present in the fuel at 10 to 40 mg/L compared to the fuel without nanoparticles These properties may indicate that the enhanced fuel as described has a better performance defined by a metric that involves a physical property described above compared to a fuel without the nanoparticles.

In preferred embodiments, the enhanced fuel comprises diesel. The term diesel may refer to a general fuel for use in an internal combustion engine that does not use a spark plug to ignite the fuel mixture, generally referred to as a diesel engine. The term diesel may also refer to a specific type of diesel fuel made from petroleum, called petroleum diesel. A petroleum diesel may comprise 50 to 100%, preferably 55 to 95%, preferably 60 to 90%, preferably 65 to 85%, preferably 70 to 80% saturated hydrocarbons. These saturated hydrocarbons may have a chemical formula wherein the number of carbons is 5 to 20, preferably 6 to 19, preferably 7 to 18, preferably 8 to 17, preferably 9 to 16, preferably 10 to 15. Other types of fuels referred to by the term diesel include synthetic diesel, a hydrocarbon mixture fuel made from a carbon-containing material such as coal, natural gas, or biomass through a chemical process that produces a liquid fuel that may have a composition similar to the petroleum diesel described above and may be used in an engine as described above, or biodiesel, a vegetable oil- or animal fat-based fuel comprising a fatty acid ester. The term "fatty" describes a compound with a long-chain (linear) hydrophobic portion made up of hydrogen and anywhere from 6 to 26, 8 to 24, 10 to 22, 12 to 20, 14 to 18 carbon atoms, which may be fully saturated or partially unsaturated, and optionally attached to a polar functional group such as a hydroxyl group, an amine group, or a carboxyl group (e.g., carboxylic acid). Fatty alcohols, fatty amines, fatty acids, fatty esters, and fatty amides are examples of materials which contain a fatty portion, and are thus considered "fatty" compounds.

Diesel may be characterized by a value related to the combustion speed and compression needed for ignition called a cetane number. A cetane number serves for diesel a similar function as the octane rating for gasoline. In preferred embodiments, the enhanced fuel has a cetane number of 30 to 75, preferably 35 to 70, preferably 40 to 65.

In some embodiments, the enhanced fuel may additionally comprise other chemicals used as diesel fuel additives known to those of ordinary skill in the art that may be advantageous for a performance characteristic of the diesel. Such additives may include, but are not limited to, cetane improvers, oxygenators, stabilizers, emulsifiers, lubricity additives, and dyes. Such additives may be added, preferably such that each individual additive is present in an amount not to exceed 1 wt % based on the total weight of the diesel.

A cetane improver is a chemical added to a diesel fuel that has the effect of increasing the cetane number of the diesel. Examples of cetane improvers are nitrates, nitroalkanes such as nitromethane, nitroethane, amyl nitrate, iso-amyl nitrate, octylnitate, 2-ethylhexyl nitrate, nitrocarbonates, and peroxides.

An oxygenator is an oxygen-containing organic compound that has the effect of increasing the oxygen content of the diesel fuel. Examples of oxygenators include methanol, ethanol, acetoacetic esters, dicarboxylic acid esters, ethylene glycol monoacetate, 2-hydroxy-ethyl esters, diethylene glycol dimethyl ether, sorbitan monooleate, polyoxyethylene sorbitan monooleate, dibutyl maleate, tripropylene glycol monomethyl ether, dimethyl ether, dimethyl carbonate, dimethoxy methane, 1-octylamino-3-octyloxy-2-propanol, dimethoxy propane, and dimethoxy ethane.

A stabilizer is a chemical added to a diesel fuel that has the effect of inhibiting disadvantageous chemical changes in the diesel such as sediment formation, gum formation, or oxidation. Examples of stabilizers are butylated hydroxytoluene (BHT), ethylene diamine, p-phenylenediamine, 2,6-di-tert-butylphenol, and 2,4-dimethyl-6-tert-butylphenol.

An emulsifier is a chemical added to a diesel fuel to prevent phase separation of water content of the fuel. Examples of emulsifiers are fatty acids, fatty esters, fatty amines, fatty alcohols, polyethylene glycols, polyvinyl alcohols, organic sulfates, organic sulfonates, organic phosphates, organic carboxylates, and polyglycerides.

A lubricity additive is a chemical added to a diesel fuel that has the effect of increasing the lubricity of the fuel. Lubricity is the measure of the reduction in friction or wear by a lubricant. Examples of lubricity additives are fatty acids, fatty esters, polyesters, and polyethers.

A dye is a chemical added to a diesel fuel that has the effect of changing the color of reflected or transmitted light as a result of wavelength-selective absorption. Certain regulatory agencies may require the use of dyes in fuels to distinguish certain properties or uses. Examples of dyes used in diesel fuel are Solvent Red 19, Solvent Red 26, Solvent Red 164, Solvent Green 33, and Solvent Blue 26.

Method for Preparing Nanoparticles

One suitable method for making the nanoparticles will now be described, although it should be understood that other methods, variations, and process equipment may utilized, some of may be known to those of ordinary skill in the art, and the nanoparticles may still function as intended.

Briefly, a powdered calcium carbonate source may be calcined at a temperature of 700 to 1100° C., preferably 800 to 1000° C., preferably 850 to 950° C. to form a calcined powder. In some embodiments, the time of the calcination step may range from 2 to 96 hours, preferably 24 to 72 hours, preferably 36 to 60 hours. This calcined powder may comprise calcium oxide formed during the calcination step from the calcium carbonate.

In some embodiments, the powdered calcium carbonate source is a powdered mineral or rock such as calcite, aragonite, vaterite, limestone, chalk, marble, or travertine. In some embodiments, the powdered calcium carbonate source is powdered seashells. In preferred embodiments, the powdered calcium carbonate source is powdered egg shells. The powdered egg shells may be processed in a way to exclude material that is not calcium carbonate in the powdered egg shells. Such processing may include physical removal of an organic membrane present inherently on an egg shell from the egg shell, washing and boiling the egg shells in water for a period of time from 1 to 8 hours, preferably 2 to 6 hours, preferably 2 to 5 hours, and subsequently grinding these washed and boiled egg shells to a fine powder using equipment to grind, pulverize, chop, mill, or other similar procedure designed to reduce the size of a solid material. After grinding, the powdered egg shells may be passed through a sieve, mesh, screen, or other piece of equipment designed to allow for size selection to obtain particles of similar sizes. In some embodiments, the sieve is designed to inhibit the passage of particles larger than 1 cm, preferably larger than 1 mm, preferably larger than 0.5 mm, preferably larger than 0.25 mm, preferably larger than 0.1 mm, preferably larger than 75 µm.

Next, the calcined powder may be mixed with water, preferably in an amount of 0.25 to 2.5 g, preferably 0.5 to 2 g, preferably 0.75 to 1.5 g, preferably 1.0 to 1.25 g of calcined powder per mL of water, to form a paste. This paste may then be subjected to a heating step at a temperature of 200 to 300° C., preferably 225 to 275° C., preferably 230 to 250° C., preferably 235 to 245° C. to form a calcium hydroxide solid. The heating step may be performed with a variety of heat sources, including but not limited to a convection oven, infrared radiation, or microwave radiation. The heating step preferably does not involve the use of ultrasonication. In preferred embodiments, the heating step may be performed using infrared radiation, preferably infrared radiation emitted by a halogen lamp, preferably using an infrared halogen convection oven. The heating step may be performed for an amount of time from 0.25 to 6 hours, preferably 0.5 to 4 hours, preferably 1 to 3 hours, preferably 1.5 to 2.5 hours. In some embodiments, the heating step may be performed in air, in dry air substantially free of water, in inert atmosphere, or under vacuum. This calcium hydroxide solid may be subsequently ground to a fine powder. This grinding may be performed using equipment to grind, pulverize, chop, mill, or other similar procedure designed to reduce the size of a solid material.

In preferred embodiments, the method does not involve the precipitation of $Ca(OH)_2$ from $Ca^{2+}$ and $OH^-$ ions dissolved in a solvent. While surfactants may be used in the formation of a paste, they are preferably not. While organic solvents may be used in the formation of a paste, they are preferably not. While the heating step may be performed at a temperature of 350 to 500° C., preferably it is not. While the reaction of hydrogen plasma on calcium metal may be used, preferably it is not.

The examples below are intended to further illustrate protocols for preparing and characterizing the nanoparticles and for preparing and characterizing the enhanced fuel and are not intended to limit the scope of the claims.

Where a numerical limit or range is stated herein, the endpoints are included. Also, all values and subranges within a numerical limit or range are specifically included as if explicitly written out.

As used herein the words "a" and "an" and the like carry the meaning of "one or more."

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

EXAMPLES

Experimental

Synthesis of Calcium Hydroxide Nanoparticles

Egg shells were collected from various local bakeries and restaurants and their organic membrane was carefully removed. Then these egg shells were washed and boiled in de-ionized water for 4 h. After boiling egg-shells were crushed and ground to fine powder in a grinding machine. The obtained egg shell powder was calcined in an electric furnace at 900° C. for 48 h. The calcined powder was passed through sieve to obtain particles of similar sizes. 5.5 g of this powder and 5 mL de-ionized water were mixed to make thick paste and heated in a thermoelectric infrared halogen oven at 240° C. for 2 h. After irradiation, the product was ground to fine powder.

Application of Calcium Hydroxide Nanoparticles as Fuel Additive

The dosage of nanoparticles in diesel was varied from 10 to 40 ppm. The quantity of nanoparticles was calculated according to the following formula: concentration (ppm)=mass of nanoparticles (mg)÷volume of fuel (L). Mass of nanoparticles for each sample was measured on an electronic balance. Then the nanoparticles were added into fuel (commercial petrol) and ultrasonicated for 30 min to prepare the modified fuel. The ignition characteristics of the fuel were measured on a flash point tester. The calorific value and specific gravity of fuel were measured by an Oxygen Bomb calorimeter and a specific gravity meter respectively. The dynamic viscosity of fuels was measured by using the Ostwald's viscometer.

Characterization

Infrared halogen convection Turbo oven of Secura Limited was used as the infrared radiation heating source. This oven was equipped with thermostat and operated at 220 V voltage and 1400 Watt power. X-ray powder diffractometer, Rigaku D/max Ultima III, operating at 0.130 A current and 40 kV voltage was used for XRD analysis of product. Diffractometer was equipped with Cu-Ka radiation source producing radiation of wavelength 0.15406 nm. The XRD pattern was scanned in 10-80° 2θ range with 0.02° scanning step. MDI JADE 5.0 and Match software was used to obtain the lattice parameters from XRD data. JEOL JSM-6480A scanning electron microscope was used to analyze the morphology of product. FEI Tecnai G2 S-Twin transmission electron microscope (TEM) operating at 200 kV accelerating voltage was used for obtaining TEM images of product. Thermal conductivity of the product was studied in 303-533 K temperature range on Hot Disk TPS 500 S Thermal Constants Analyzer with an attached electric oven. Two pellets (diameter 1.5 cm, height 5 mm) of product were cast using a Pellet Press. Sensor 7577 was used, and measurement was taken at power 100 MW and time 160 s. Stainless steel 304 calibration standard having thermal conductivity 16.2±0.1 W/mK at 100° C. temperature was used with this instrument. APEX-JCX309 Closed Cup Flash Point Tester, Apex Lab Equipment Company, operating at standard GB/T 261-2008 (Pensky-Martens method) was used for determination of flash point and fire point of fuel samples. 100 mL of fuel sample was poured into the cup of tester and flame was applied to determine the flash point and fire point. Gravity meter DA-640, Kyoto Electronics Manufacturing Corporation Limited, was used for measurement of specific gravity of fuel samples. Around 5 mL of fuel sample was run through the tube of the specific gravity meter and value was measured. APEX-JCX406 Oxygen Bomb calorimeter operating at standard GB/T 213 was used for determination of calorific value of fuel samples. 1 mL of fuel sample was poured into the tube of the calorimeter and 220 V was applied to burn the copper wire and ignition was produced. Ostwald's viscometer was used to determine dynamic viscosity of fuel samples. Silicone oil having viscosity 0.094±0.001 P and specific gravity 0. 9336±0.0002 g/mL at 25° C. was used as calibration reference standard. 20 mL fuel sample was taken in viscometer and time of measurement of flow of sample through capillary tube was measured. Then kinematic viscosity is determined by dividing the dynamic viscosity with specific gravity. Cloud point of samples was measured by pouring it into a test jar to a level about half fill. A cork was used to close the jar and had a test thermometer. The bulb of thermometer was positioned to the bottom of jar. The entire set up was maintained in constant temperature cooling bath. After every 1° C., the jar was taken out and cloud point is noted when cloudy appearance was observed in the sample. The temperature was noted when the sample did not flow for 5 s while holding in horizontal direction. 3° C. was added to that temperature and noted as pour point.

Results and Discussion

X-Ray Diffraction Powder Analysis

Figures 2A, 2B, 2C:
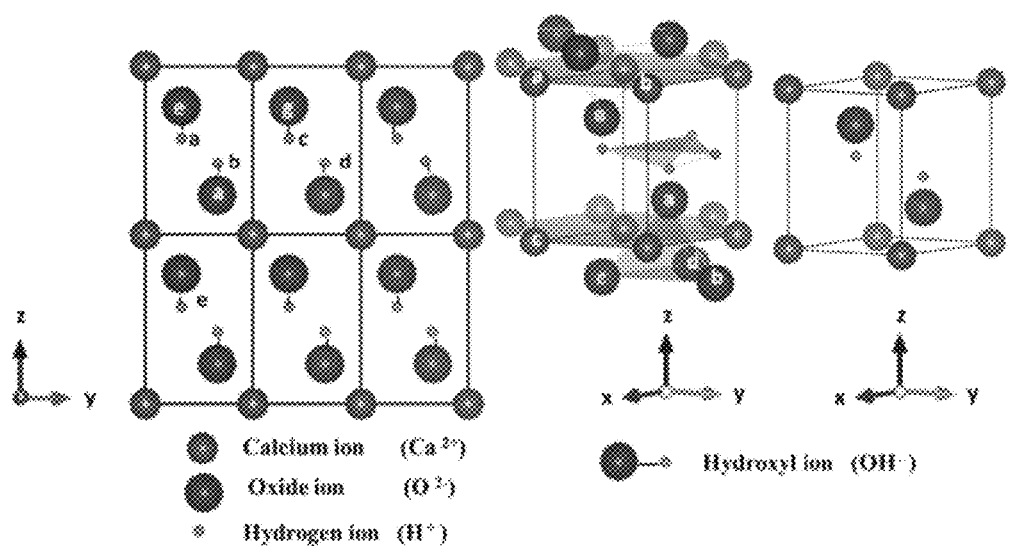
FIG. 2A shows the hexagonal packing of calcium and hydroxyl ions.
FIG. 2B shows the formation of hexagonal lattice from arrangement of trigonal unit cells.
FIG. 2C shows a single trigonal unit cell of $Ca(OH)_2$.

The XRD pattern of radiation heated product is shown in FIG. 1. The peaks were identified and indexed by comparing it with standard XRD pattern of $Ca(OH)_2$ (JCPDS 04-0733) [P. Kamalanathan, S. Ramesh, L. T. Bang, A. Niakan, C. Y. Tan, J. Purbolaksono, H. Chandran, W. D. Teng, Ceram. Intl. 40 (10, Part B) (2014) 16349-16359] and [S. Li, H. Bai, J. Wang, X. Jing, Q. Liu, M. Zhang, R. Chen, L. Liu, C. Jiao, Chem. Eng. J. 193 (2012) 372-380]. The peaks were identified at specific 2-theta values whose detail is given in Table 2. The details of cell dimensions, density, atom coordinates, inter-ionic distances, number of formula units and miller indices are also provided in Table 2. Data analysis tells that prepared product belongs to space group P-3 ml of trigonal crystal system. Eight calcium ions and two hydroxyl ions are present in one unit cell. Calcium ions are located at the corners of unit cell, so it is shared with eight adjacent unit cells. So, overall contribution of eight calcium ions is one. Hydroxyl ions are located within the unit cell, so it is not shared with other unit cells. So, one formula unit (Z) per unit cell is present. The calcium and hydroxyl ions are arranged in hexagonal packing. It means calcium and hydroxyl ions layers alternate with each other. The hydroxyl ions are located in the spaces of calcium ions layer but they are not present exactly in the middle of the spaces of calcium ions layer (FIG. 2A). Oxygen atoms are located around calcium ions (FIG. 2B). The distance between same ions (calcium, oxygen and hydrogen) present in same layer is equal. The distances among all ions are calculated and given in Table 2. A single trigonal unit cell is shown in FIG. 2C.

TABLE 2

Summary of structural parameters of trigonal crystal system of $Ca(OH)_2$.

| Parameter | Result |
|---|---|
| Name of compound | Calcium hydroxide (portlandite) |
| Crystal system | Trigonal (hexagonal axes) |
| Type | Primitive |
| Space group | $P\bar{3}m1$ (1 6 4) |
| Cell parameters | |
| a, b, and c (Å) | 3.5862, 3.5862 and 4.8801 |
| α, β and γ ( ) | 90.000, 90.000 and 120.000 |
| Atom coordinates | |
| x, y and z of Ca | 0.000, 0.000 and 0.000 |
| x, y and z of O | 0.333, 0.667 and 0.235 |
| x, y and z of H | 0.333, 0.667 and 0.428 |
| Distance (Å) | |
| $Ca_a$-$Ca_b$ | 3.58620 |
| $Ca_a$-$Ca_c$ | 4.88010 |
| $O_a$-$O_b$ | 3.09064 |
| $O_a$-$O_d$ | 3.09064 |
| $O_a$-$O_e$ | 3.08856 |
| $O_b$-$O_c$, $O_b$-$O_d$, $O_c$-$O_d$, $O_c$-$O_R$ | 3.58620 |
| $O_a$-$O_c$ | 3.31181 |
| $O_a$-$O_R$ | 3.31376 |
| $H_a$-$H_b$ | 2.15748 |
| $H_b$-$H_c$ | 2.18454 |
| $H_a$-$H_c$ | 3.58620 |
| $H_a$-$H_e$ | 4.88010 |
| $O_c$-$H_a$ | 0.94186 |
| No. of formula unit per unit cell (Z) | 1 |
| Density (g/cm$^3$) | 2.262 |
| Volume (Å$^3$) | 54.9 |
| Spacing ($d_{hkl}$) (Å), 2-theta ( ) and miller indices (h k l) | 4.90900, 18.0554 and (0 0 1) |
| | 3.11163, 28.6650 and (1 0 0) |
| | 2.62814, 34.0860 and (1 0 1) |
| | 2.45450, 36.5796 and (0 0 2) |
| | 1.92711, 47.1196 and (0 1 2) |
| | 1.79650, 50.7785 and (1 1 0) |
| | 1.68708, 54.3327 and (1 1 1) |

The closer analysis of the pattern revealed that some additional peaks are also present in the pattern. These peaks refer to the standard XRD pattern of calcium carbonate (JCPDS 05-0586) [T. A. Hassan, V. K. Rangari, R. K. Rana, S. Jeelani, Ultrason. Sonochem. 20 (5) (2013) 1308-1315—incorporated herein by reference]. The peaks of this minor phase were observed at 2-theta values of 29.4°, 47.4°, 48.5°, 64.6° and 73.6° which were indexed to (1 0 4), (0 1 8), (11 6), (3 0 0) and (3 0 6) miller indices respectively. This indicates that product contains calcium carbonate phase in a small amount. This was either due to incomplete decomposition of egg shells (calcium carbonate) into calcium oxide during calcination at 900° C. or due to carbonation of $Ca(OH)_2$ upon air exposure [C. Rodriguez-Navarro, A. Suzuki, E. Ruiz-Agudo, Langmuir 29 (36) (2013) 11457-11470]. $Ca(OH)_2$ reacts with atmospheric carbon dioxide and produces calcium carbonate ($Ca(OH)_2+CO_2 \rightarrow CaCO_3+H_2O$). That could explain why calcium carbonate was present in the final product.

Scanning Electron Microscopic Analysis

The SEM images of the product at different magnifications are shown in FIG. 3A-3D.

Figure 3A:
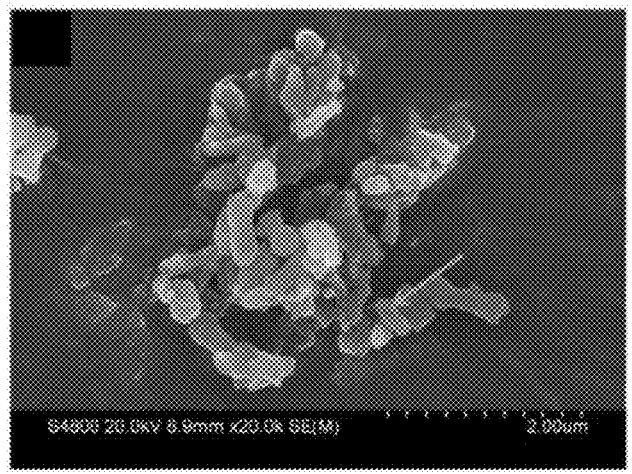
FIG. 3A is an SEM image showing an overall view of dumbbell-shaped $Ca(OH)_2$ microstructures.
Figure 3B:
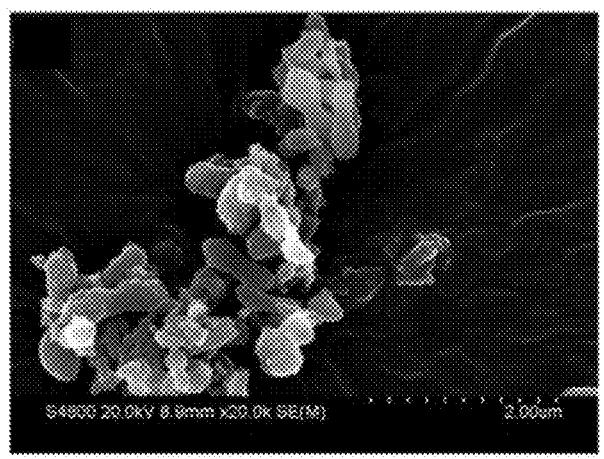
FIG. 3B is an SEM image showing an overall view of dumbbell-shaped $Ca(OH)_2$ microstructures.
Figure 3C:
FIG. 3C is an SEM image showing a close-up of randomly-arranged dumbbell microstructures.
Figure 3D:
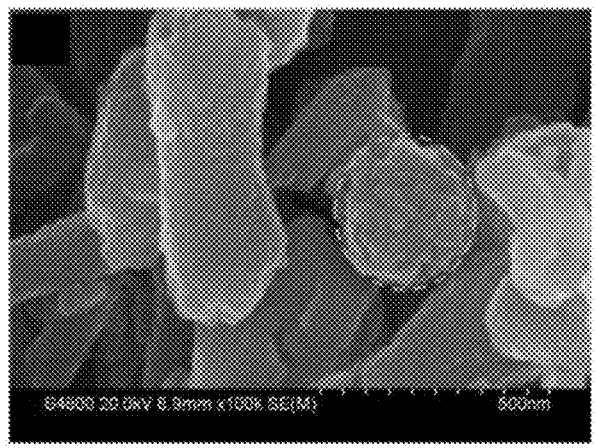
FIG. 3D is an SEM image showing a close-up of randomly-arranged dumbbell microstructures.

FIGS. 3A and 3B indicate that product mainly consists of dumbbell like microstructures. These structures possess bulgy terminal ends. The width of these structures at center is less than that of terminal ends, therefore these structures look just like dumbbells. The length of these structures lies in 0.8-0. 9 µm range approximately. The width of these structures at center and edges are approximately 0.15-0.2 µm and 0.3-0.4 µm respectively. It seems from FIGS. 3C and 3D that the surface of dumb bell is not compact. It is porous. FIGS. 3C and 3D reveals that these microstructures are formed by loose arrangement of tiny spherical/oval nanoparticles. The diameter of these nanoparticles lies in 10-50 nm range. Various scientists have reported different morphologies of $Ca(OH)_2$ structures. An overview of different morphologies, their dimensions, and synthesis method is given in Table 1. It is observed that hexagon like morphologies are mostly synthesized from the commercial calcium sources. But flower, dumbbell, and cube like morphologies are fabricated from natural calcium sources like egg shell and clam shell. It means unique morphologies can be easily synthesized from natural calcium sources. The properties of nanomaterials strongly depend on their morphology and size and natural calcium source can help to fabricate them.

Transmission Electron Microscopic Analysis

Figure 4A:
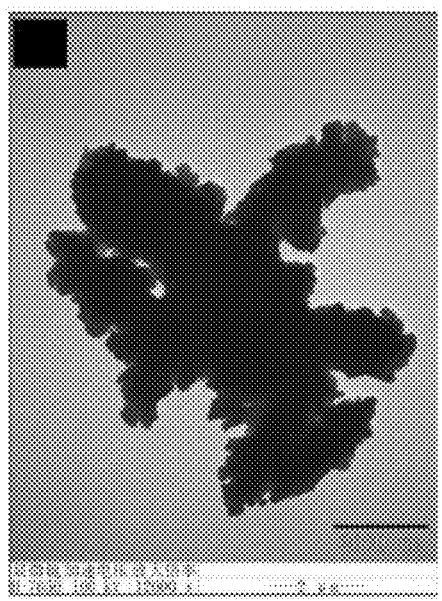
FIG. 4A shows a view of many particles joined with each other.
Figure 4B:
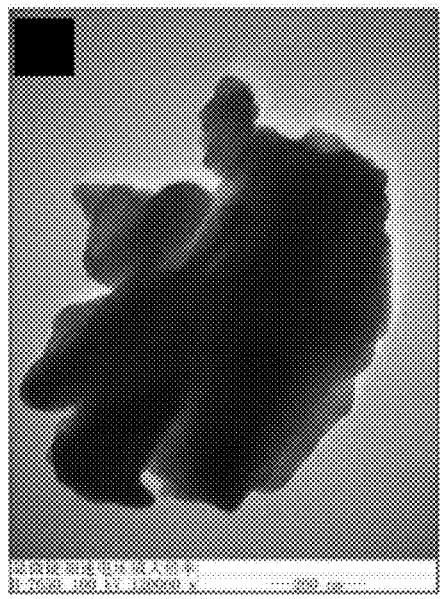
FIG. 4B shows a top view of bulging end of microstructure.
Figure 4C:
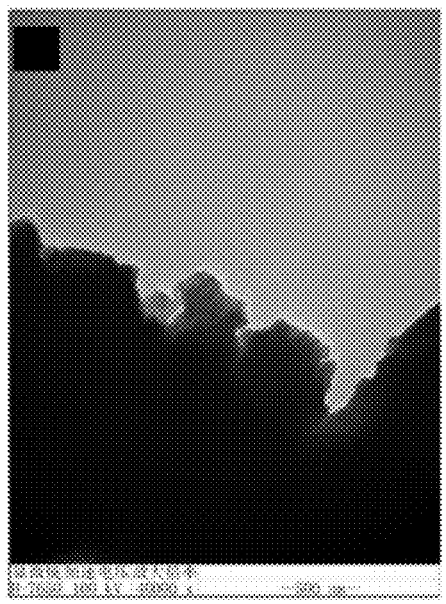
FIG. 4C shows a view of the surface of a microstructure at 40,000×.
Figure 4D:
FIG. 4D shows a view of the surface of a microstructure at 80,000×.
Figure 4E:
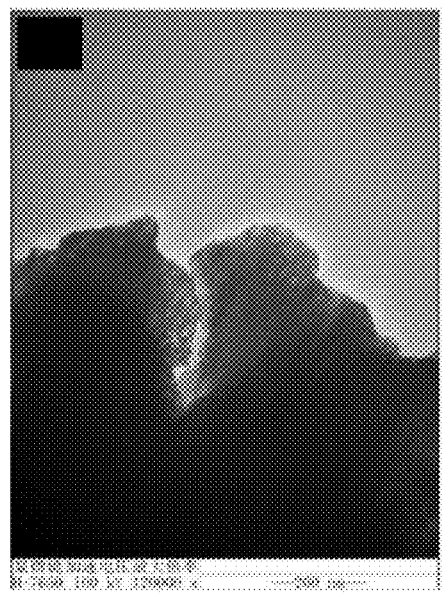
FIG. 4E shows a view of the surface of a dumbbell at 120,000× magnification.
Figure 4F:
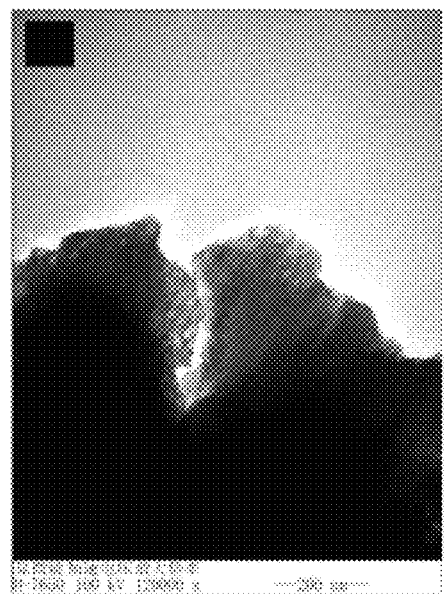
FIG. 4F shows a view of the surface of a dumbbell at 120,000× magnification.

The TEM images of dumbbell shaped $Ca(OH)_2$ microstructures are shown in FIGS. 4A-4F. These images clearly show that these dumbbells are not hollow. It is also clear from FIG. 4A that the surface of the structures is not smooth. This non-uniform surface has developed due to the loose arrangement of nanoparticles. The top view image of the terminal end of microstructures is shown in FIG. 4B. The non-uniformity also exists at the terminal ends of the microstructures (FIG. 4B). The TEM images of the surface of these microstructures at 40,000× and 80,000× magnifications are shown in FIGS. 4C and 4D respectively. The porous surface is clearly visible in these TEM images. Therefore, it is confirmed from these images that the microstructures are porous and made up of very small nanoparticles.

Formation Mechanism

The egg shells are converted into calcium oxide (CaO) after calcination. When calcined egg shells (CaO) are dissolved in water, water molecules react with CaO and $Ca(OH)_2$ is formed (Eq. (1)).

$$CaO+H_2O \rightarrow Ca(OH)_2 Ca^{2+}+2OH^- \qquad (1)$$

Figure 5:
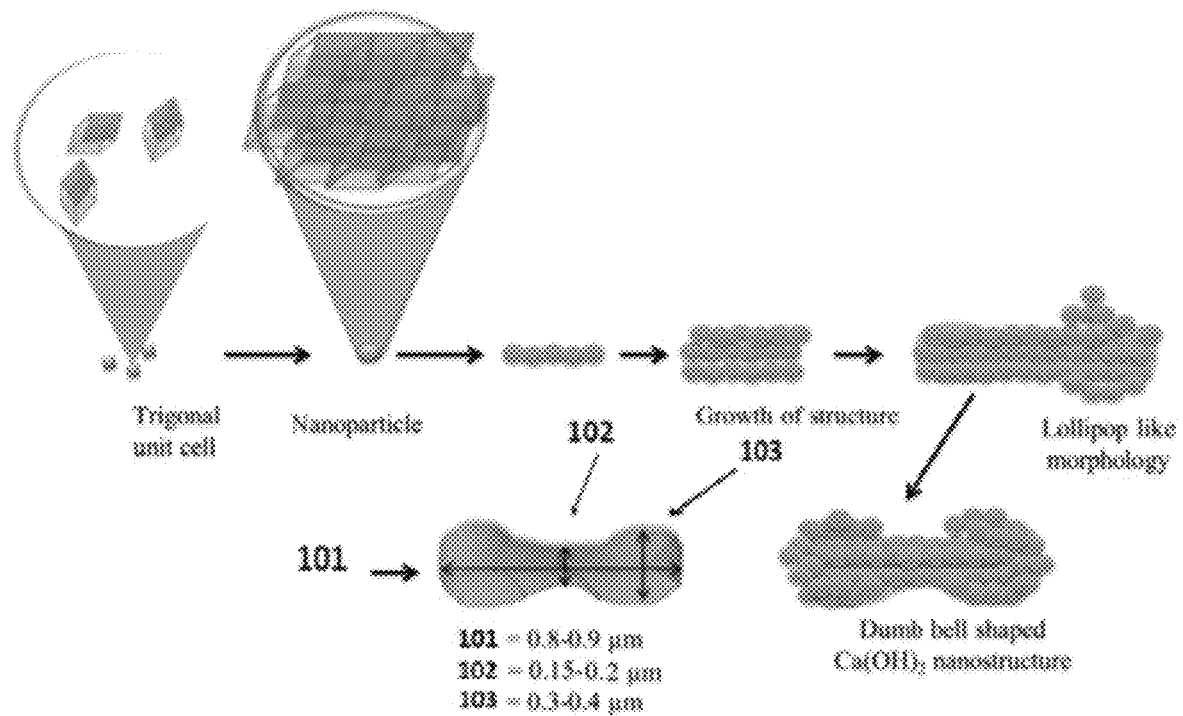
FIG. 5 shows the formation mechanism of dumbbell shaped $Ca(OH)_2$ microstructure.

The calcium and hydroxide ions are arranged in the form of trigonal unit cells. As soon as the trigonal unit cells are formed, they grow into spherical/oval nanoparticles under the stimulus of temperature and radiation. Then, these nanoparticles start to gather around a single nanoparticle acting as a nucleus as shown in FIG. 5. Nanoparticles arrange side by side in the form of a small rod. Then nanoparticles then arrange to form multiple layers around this rod. The reaction conditions have influenced the nanoparticles to arrange at one end of this rod and a lollipop like structure is formed. The length of the structure is also increased due to arrangement of nanoparticles at the end. Later, the nanoparticles gather around the other end and a dumbbell like structure is formed. In this way, the radiation and temperature has influenced the growth of nanoparticles into dumbbell like morphology. Some rod-like structures (indicated by green arrow in FIG. 3A) are also present in the product. Moreover, some lolly pops-like structures are also present in these SEM images (indicated by arrow in FIG. 3C). These lolly pops-like structures have bulging at one end only. Comparison of these two shapes reveals that the dumbbell like microstructures have arisen from aggregation of nanoparticles in a specific pattern.

Thermal Behavior of Calcium Hydroxide Microstructures

Figure 6A:
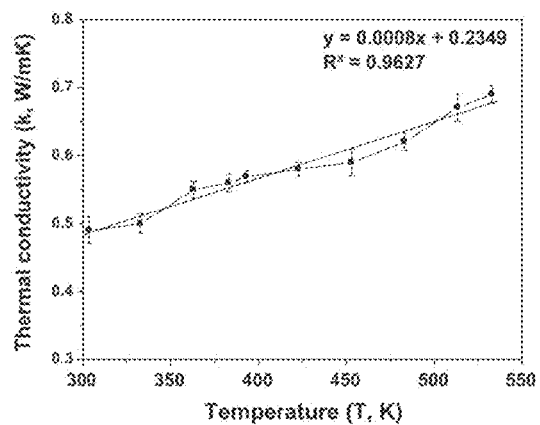
FIG. 6A shows the plot of thermal conductivity of the synthesized microstructures as a function of temperature in 303-533 K range.

Thermal properties of $Ca(OH)_2$ microstructures have been studied in 303-533 K temperature range. The plot of thermal conductivity as a function of temperature is shown in FIG. 6A. It is observed from FIG. 6A that thermal conductivity increased with increasing temperature. The kinetic energy of phonons increases with increasing temperature, so the frequency of phonons and thermal conductivity increase resultantly. It is observed that thermal conductivity linearly increases with increasing temperature. It is also analyzed that the values are well fitted to relation k a T, which shows that $Ca(OH)_2$ microstructures do not follow the Debye model (according to the Debye model, the thermal conductivity is directly proportional to cube of temperature [H.-K. Lyeo, D. G. Cahill, B.-S. Lee, J. R. Abelson, M.-H. Kwon, K.-B. Kim, S. G. Bishop, B.-K. Cheong, Appl. Phys. Lett. 89 (15) (2006) 151904-151906—incorporated herein by reference]). The thermal conductivity has also been studied in the 333-533 K temperature range. The number of phonons increases with increasing temperature, so the thermal conductivity of materials increases with increasing temperature as well. The data of thermal conductivity of $Ca(OH)_2$ has not been reported in literature previously, so the reported values of this work cannot be compared with literature.

Figure 6B:
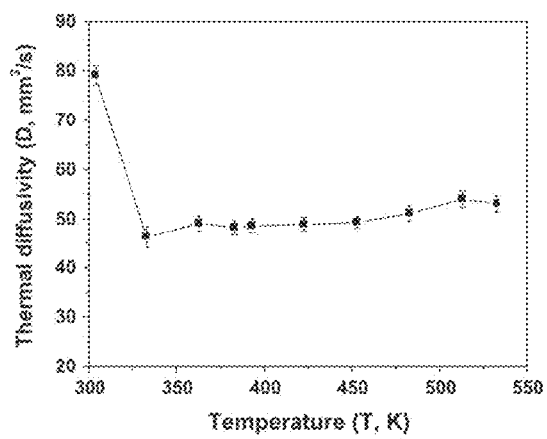
FIG. 6B shows the plot of thermal diffusivity of the synthesized microstructures as a function of temperature in 303-533 K range.
Figure 6C:
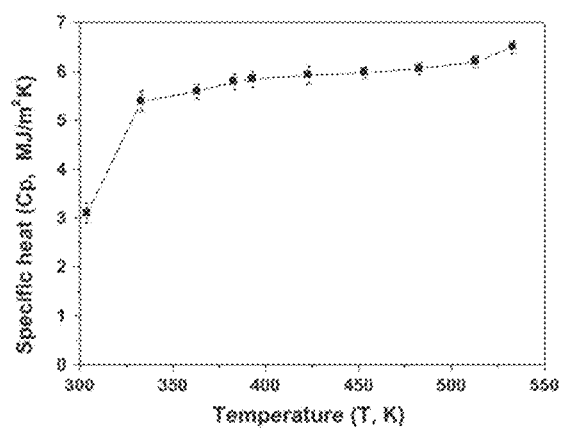
FIG. 6C shows the plot of specific heat of the synthesized microstructures as a function of temperature in 303-533 K range.

A plot of thermal diffusivity as a function of temperature is given in FIG. 6B. Initially, the value of thermal diffusivity decreases with increasing temperature up to 363 K, but the value of thermal diffusivity increases with increasing temperature above 363 K. Thus, the value of thermal diffusivity was observed to be a minimum at 363 K temperature in studied temperature range. Moreover, the plot of specific heat as a function of temperature is given in FIG. 6C. The value of specific heat increases with increasing temperature in the studied temperature range. The increase in specific heat is very sharp when temperature increases from 303 to 363 K temperature, but the increase in specific heat with increasing temperature above 363 K is not very prominent. The comparison of values of thermal diffusivity and specific heat suggest that these microstructures possess better heat transport ability in 363-533 K temperature range.

Application of Dumbbell Microstructures as Fuel Additive

The physicochemical properties of diesel and modified fuel (diesel containing additive) were studied under identical laboratory conditions so that the results could be compared and the effects of various dose levels of additive on different properties of fuel were identified. Values of flash point, fire point, calorific value, cloud point and pour point were measured to analyze the combustion characteristics of fuel and modified fuel. Similarly, values of specific gravity and kinematic viscosity were measured to analyze the physical characteristics of fuel and modified fuel. The values of these combustion and physical characteristics are given in Table 3. These values were measured at 0, 10, 20 and 40 ppm dosage level of additive in fuel.

TABLE 3

Summary of physicochemical properties of fuel and modified fuel.

| Properties | Fuel without additive | Modified fuel (fuel with additive) | | |
|---|---|---|---|---|
| | | 10 ppm | 20 ppm | 40 ppm |
| Calorific value (MJ/kg) | 0.950 | 30.125 | 34.185 | 41.930 |
| Flash point (° C.) | 64.5 | 66.0 | 68.0 | 72.0 |
| Fire point (° C.) | 73.5 | 75.0 | 77.0 | 83.0 |
| Specific gravity (g/cm$^3$) at 25° C. | 0.1149 | 0.1482 | 0.2572 | 0.3472 |
| Kinematic viscosity (m$^2$/s) at 25° C. | 2.68 × 10$^{-6}$ | 2.76 × 10$^{-6}$ | 2.86 × 10$^{-6}$ | 3.2 × 10$^{-6}$ |
| Cloud point (° C.) | −4.0 | −4.0 | −4.0 | −5.0 |
| Pour point (° C.) | −14.5 | −15.5 | −17.0 | −16.0 |

The calorific value of fuel having 10 ppm dosage of additive was observed to be thirty times greater than that of fuel having no additive. It means the calorific value has remarkably increased by addition of 10 ppm dosage only. The nanoparticles possess high surface area to volume ratio, so large number of fuel molecules can easily adsorb on surface of nanoparticles. The nanoparticles have efficient surface properties, so they efficiently catalyze the combustion of fuel [V. Sajith, C. Sobhan, G. Peterson, Adv. Meehan. Eng. 21 (I) (2010) 143-151], [T. Shaafi, K. Sairam, A. Gopinath, G. Kumaresan, R. Velraj, Renew. Sust Energy Rev. 49 (2015) 563-573], and [A. Epshteyn, M. R. Weismiller, Z. J. Huba, E. L. Maling, A. S. Chaimowitz, Energy Fuels 31 (2) (2017) 1811-1819]. That is why a large amount of heat energy was produced on combustion of fuel in the presence of nanoparticles. Moreover, the differences among the calorific value of fuel having 10 ppm, 20 ppm and 40 ppm dosages were not very significant. The calorific value of fuel having 20 ppm dosage was 1.13 times greater than that of fuel having 10 ppm dosage. Similarly, the calorific value of fuel having 40 ppm dosage was 1.22 times greater than that of fuel having 20 ppm dosage. This could be due to a very small number of active sites being available on the surface of nanoparticles for attachment of fuel or oxygen when dosage exceeds 10 ppm, which leads to very small increase in calorific value.

The flash and fire points of fuel and modified fuel are given in Table 3. The flash point of diesel (fuel) indicates its volatility [L. Jeryrajkumar, G. Anbarasu, T. Elangovan, Intl. J. Chem. Tech. Res. 9 (4) (2016) 210-219]. The flash point of fuel was determined to be 64.5° C. It increased with increasing the dosage of nanoparticles. The flash point of modified fuels was greater than that of pure fuel, which indicates that the volatility of modified fuel was smaller than that of pure fuel. The fire point of pure fuel was determined to be 63.5° C. It was observed that the fire point value of modified fuels was greater than that of pure fuel. The difference between flash and fire points of fuel and modified fuels were almost 10° C., which suggests that the measurements were carefully obtained by the instrument. It is recommended that the fire point of fuel be ~10° C. higher than that of flash point for safety reasons [J. G. Dale, S. S. Cox, M. E. Vance, L. C. Marr, M. F. Hochella Jr, Environ. Sci. Technol. 51 (4) (2017) 1973-1980]. The high value of flash and fire points suggest easy safe handling of fuels [M. Mirzajanzadeh, M. Tabatabaei, M. Ardjmand, A. Rashidi, B. Ghobadian, M. Barkhi, M. Pazouki, Fuel 139 (2015) 374-382]. High values of flash and fire points make transportation of fuel cheaper and easier [V. Chandrasekaran, M. Arthanarisarny, P. Nachiappan, S. Dhanakotti, B. Moorthy, Transport Res. Part D Trans. Environ. 46 (2016) 145-156] and [M. Sgroi, M. Asti, F. Gili, F. A. Deorsola, S. Bensaid, D. Fino, G. Kraft, I. Garcia, F. Dassenoy, Tribol. Intl. 105 (2017) 317-325]. It reduces the chance of accidental fire during transportation or any mishandling.

The kinematic viscosity of fuel was measured to be greater than that of modified fuels. It means the nanoparticles have increased resistance between layers of fuel which results in high viscosity. Fuel combustion, hydrocarbon emission and fuel atomization depend upon the kinematic viscosity of fuel. High viscosity of fuel provides reduced chances of leakage or turbulent flow. Moreover, high viscosity fluids form large droplets on atomization, which reduces the combustion ability [P. M. Guerieri, J. B. DeLisio, M. R. Zachariah, Combust. Flame 176 (2017) 220-228]. Thus, the percentage of unburnt hydrocarbons is increased in engine emissions. This means the lubricating characteristic of fuel was enhanced upon nanoparticle addition while the atomization characteristic (or combustion ability) of fuel was weakened. The kinematic viscosity influences the engine performance in two different ways, so a balance between atomization and lubrication characteristics is desired. $2.76 \times 10^{-6}$ m$^2$/s is the precise value of viscosity which leads to the improvement in efficiency of engine working on diesel.

The cold temperature characteristics like cloud and pour points are given in Table 3. The cloud and pour points of fuel and modified fuels differ by approximately 1° C. only. It means no significant difference was observed in value of cloud and pour points of fuels and modified fuels. It means nanoparticle addition does not affect the cold temperature characteristics of fuels, thus no specific strategy is required for their handling at cold temperatures.

The specific gravity of modified fuel is greater than that of pure fuel. Moreover, the value of specific gravity was found to increase with increase in nanoparticles dosage. This is due to addition of nanoparticles into fuel.

On comparison of the physical and combustion characteristics of fuel and modified fuels, it becomes clear that the best compromise of properties is possessed by 20 ppm modified fuel. They have high calorific value, average viscosity, high flash point and high fire point.

Calcium hydroxide was successfully synthesized from calcined egg shells using an infra-red assisted synthesis approach. The morphology of the product was determined using scanning electron microscopy (SEM) and transmission electron microscopy (TEM). The dumbbell shaped microstructures have a length of approximately 0.8-0.9 μm and are composed of spherical nanoparticles of size 10-50 nm. The nanoparticles are loosely arranged and form porous dumbbell microstructures. X-ray powder diffraction analysis confirmed that the product contains all the characteristic peaks of calcium hydroxide. The value of thermal conductivity of the product increases with an increase in temperature due to an increase in number of phonons. A slight hump was observed at 363 K temperature due to phonon scattering at defects. The comparison of all the physicochemical characteristics of modified fuels indicates that 20 ppm modified fuel possessed the best compromise among calorific value, kinematic viscosity, flash point and specific gravity.

The invention claimed is:

1. Nanoparticles of calcium hydroxide having a dumbbell shape, wherein the dumbbell shape has rounded ends separated by a narrow central portion, wherein a ratio of a largest width of the narrow central portion to a largest width of the rounded ends is 0.30 to 0.75, and a length in a range of 500 nm to 1100 nm.

2. The nanoparticles of claim 1, wherein the largest width of the narrow central portion is 100 to 250 nm.

3. The nanoparticles of claim 1, wherein the nanoparticles have a mesoporous or macroporous structure.

4. The nanoparticles of claim 1, which comprise agglomerated subparticles.

5. The nanoparticles of claim 4, wherein the agglomerated subparticles have a size of 5 to 75 nm.

6. The nanoparticles of claim 1, which have a thermal conductivity of 0.40 to 0.80 Wm$^{-1}$K$^{-1}$ in a temperature range 290 to 550 K.

7. The nanoparticles of claim 1, which have a thermal diffusivity of 0.35 to 0.90 mm$^2$s$^{-1}$ in a temperature range 290 to 550 K.

8. The nanoparticles of claim 1, which have a specific heat of 2.75 to 7.00 MJm$^{-2}$K$^{-1}$ in a temperature range 290 to 550 K.

* * * * *